HEATING AND/OR COOLING AND/OR DEODORIZING AND/OR HUMIDITY CONTROL AND/OR GERMICIDAL CONTROL

*INVENTOR.*
Heinz Georg Baus
BY
*ATTORNEY*

INVENTOR.
Heinz Georg Baus
BY *Otto John ......*
ATTORNEY

July 18, 1967

H. G. BAUS 3,331,304

AIR EXCHANGE SYSTEM WITH AN AUTOMATICALLY
CONTROLLED VENT CONTROL

Filed Feb. 18, 1966

INVENTOR.
Heinz Georg Baus

BY

ATTORNEY

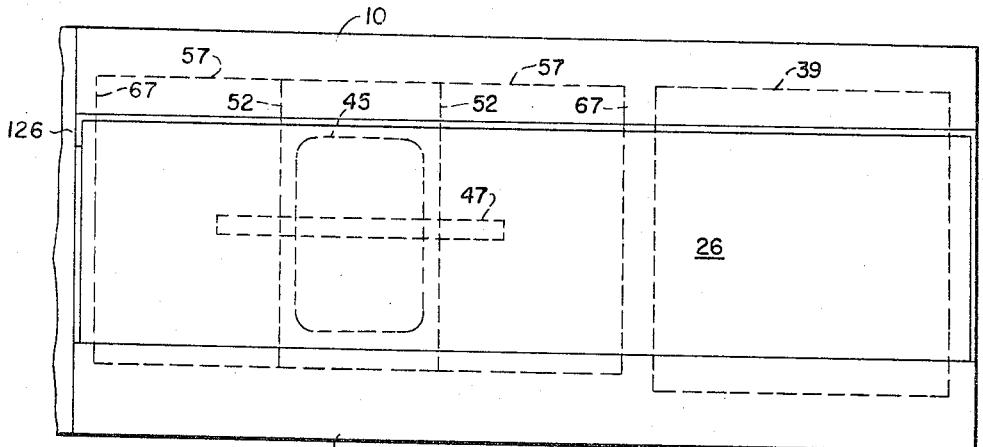
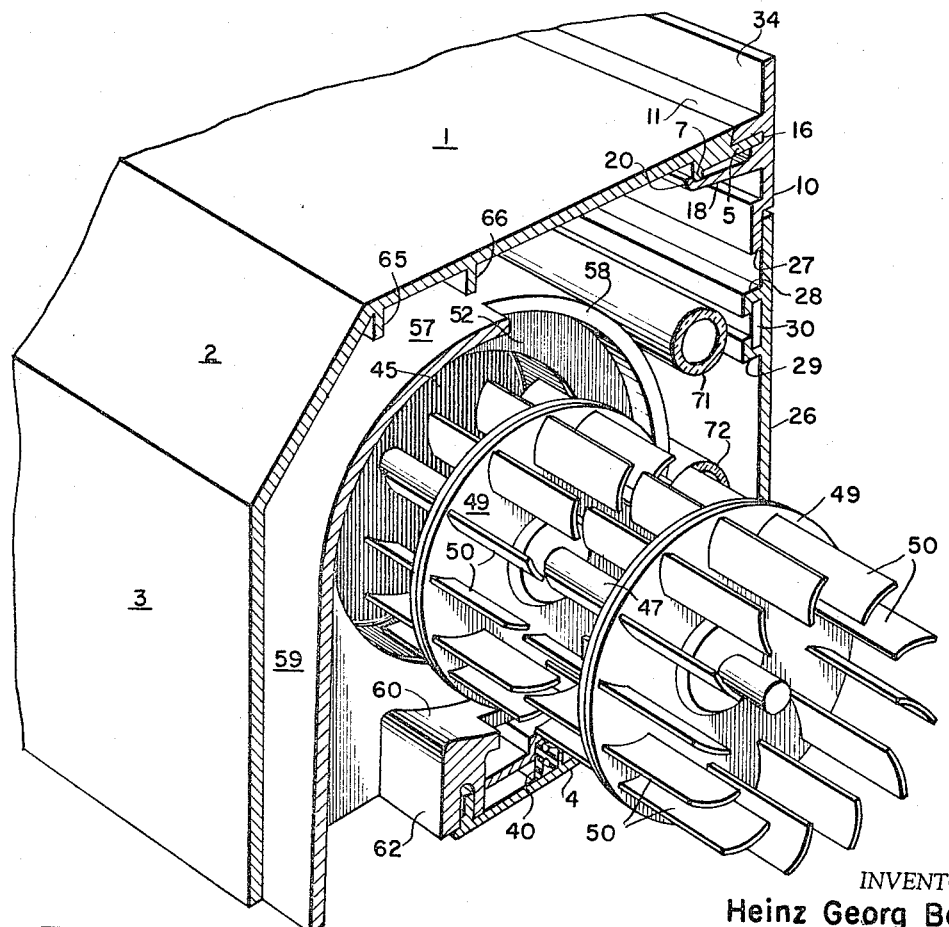

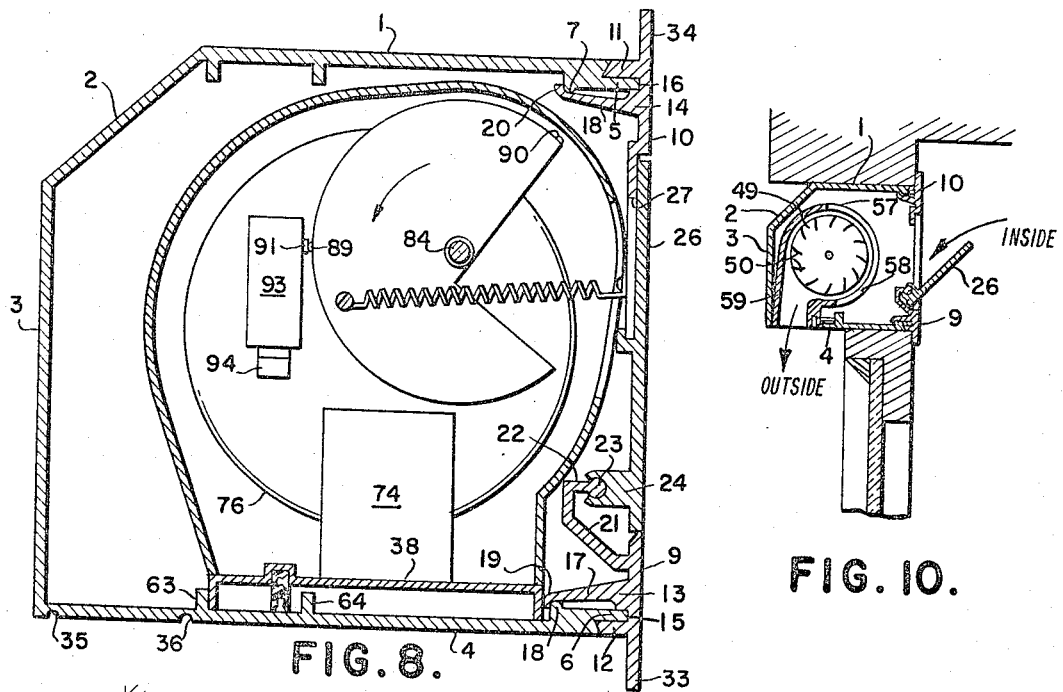
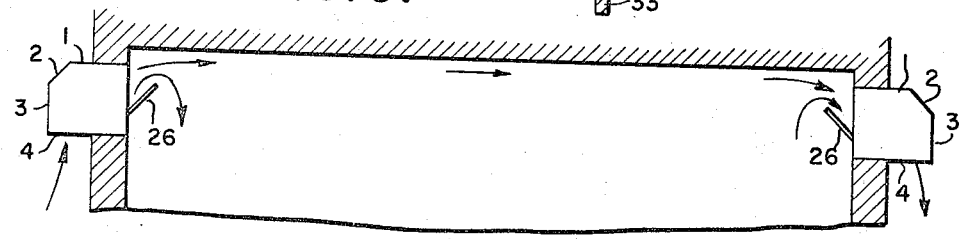
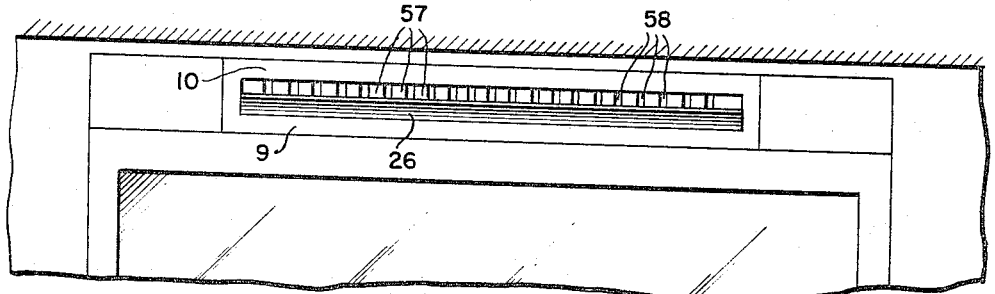
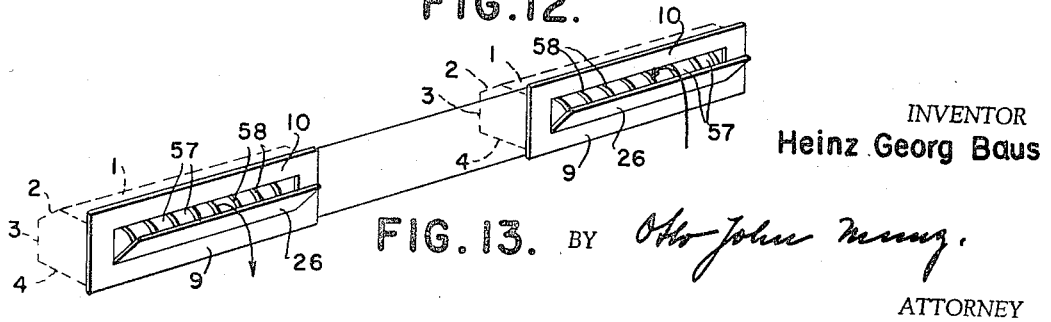

United States Patent Office 3,331,304
Patented July 18, 1967

3,331,304
AIR EXCHANGE SYSTEM WITH AN AUTOMATICALLY CONTROLLED VENT CONTROL
Heinz G. Baus, 28 Am Oberen Luisenpark,
Mannheim, Germany
Filed Feb. 18, 1966, Ser. No. 528,462
Claims priority, application Germany, Feb. 24, 1965,
B 60,868, B 60,869
19 Claims. (Cl. 98—39)

The present invention relates primarily to an air exchange system in closed spaces.

The objects of the invention are:

To provide an outer housing for a ventilating unit and or for a plurality of ventilating units of standard sizes, which housing can be manufactured as a lengthwise endless profiled body, for instance by extrusion, and can be cut lengthwise at a length necessary to accommodate the desired amount of units called for in each particular installation;

To provide a connection between the ventilator housing, which is built in the form of a box frame open on one side, and its sealing piece as well as the connection between the sealing piece and the louver in a reliable manner;

To provide a ventilating unit of a very small size, weight, and simplicity of construction, and capable of assembly on an endless belt, having however the capacity of much larger, heavier, more complex and difficult to assemble units of the present art, and when assembled into a plurality of units, further increasing its capacity in unison;

To provide the units described above having radial vanes, rotating perpendicularly to the exhaust and intake planes, instead of the axial fans of the present art, whereby drafts and noise are avoided;

To provide a unit and a plurality of units described above in assemblies, which are well suited for easy installation into openings in walls and into and over windows and doors;

To provide the units of the type mentioned above with air exit and intake vent check valves automatically controlled in synchronization with the function of the air pump, whereby either the air pump or the vent closing means may be omitted from the one unit assembly;

To provide a ventilating system composed of pluralities of units for closed in spaces such as buildings, cars, planes, etc., with an assembly of air pump and vent closing units spaced from another assembly equipped with vent closing units only, whereby variation between the inside pressure of the closed space and the outside pressure is utilized in aiding the ventilating function;

To provide the units aforesaid with a CO detector, heat control, air filtering, desinfecting, humidifying, dehumidifying, perfumizing and other means in the same installation;

To provide a ventilator to wall attachment which is easily attachable and so designed that possible damaging of the edges of the wall can be covered.

Other objects and many advantages of the invention will become apparent to those skilled in the art, after study of the following detailed description, in connection with the accompanying drawings, in which FIG. 1 is a fragmentary front elevational view with parts in section, taken on the line I—I of FIG. 2;

FIG. 7 is a partial front elevational view;

FIG. 8 is a side elevational view with parts in section showing means alternative to those shown in FIG. 3 to open the vent;

FIG. 9 is a perspective view with parts in section showing a plurality of radial vanes in the endlessly produced housing profile;

FIG. 10 is a side elevational view with parts in section showing means of mounting the assembly in a window;

FIG. 11 is a side elevational view of the system of the present invention as installed with two assemblies operating with positive inside and negative outside pressure;

FIG. 12 is a front plan view of an assembly unit mounted over the top of a window;

FIG. 13 is a perspective view showing two assembled units, a vent operating and an air sucking unit, to be mounted in the same window in lieu of the single unit shown in FIG. 12.

Figure 1:
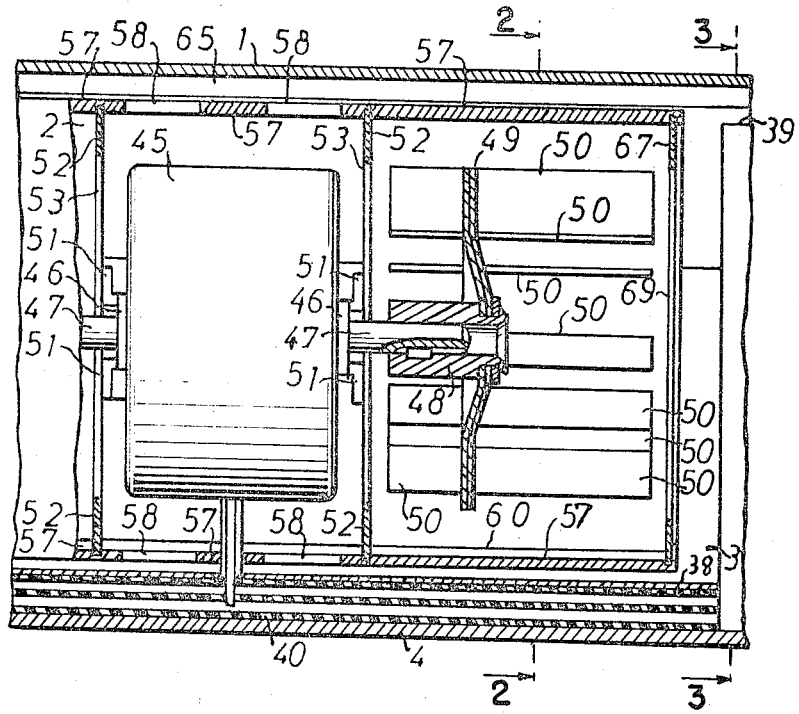

The outer housing 68 is specifically designed for mass production as an endless profiled body, such as by extrusion, from a light metal, aluminum, or aluminum alloys. It has at least three integral walls comprising a top 1, a rear wall 3 and a floor 4, without a front wall. An inclined wall 2 connecting the top and the rear wall is also shown, its purpose being to impart to the housing an improved design shape, while simultaneously saving on material and space.

The housing is cut for purposes of assembly with the units described hereinafter into standard length corresponding to the also standardized width of the units, or into multiples of such length, as will be required by the number of units to be assembled in one housing.

A front wall assembly 25 is manually pressed onto the housing and the respective rims of the housing are already extruded with the projections necessary for mating with this assembly.

Located toward the edges of the top 1 and the floor 4 on the open end 25 of the box frame are projecting slats 5 and 6, which are offset toward the opening. Surfaces inclined toward the back wall or rounded surfaces are situated on the back of these slats or on special, continuous ribs 7 and 8. A lower sealing piece 9 and an upper sealing piece 10 have edge slats 11 and 12 in the planes of the floor 4 and the top 1. These edge slats, together with reinforcements 13, 14, enclose grooves 15, 16, which receive the slats 5 and 6. Slats 5 and 6 and grooves 15 and 16 are a type of tongue and groove means. The reinforcements carry, in addition, springy flanges 17, 18, which project inward and which are shown equipped with end ribs or claws 19, 20. Those flanges taper into the end ribs or claws. The surfaces of the end ribs 19, 20, which are turned respectively downwards and upwards, grip behind the inwardly directed surfaces of the ribs 7, 8. Due to the spring tension of the flanges 17, 18, the sealing pieces 9, 10 are held securely. Ribs 7 and 8 and flanges 17 with their claws form a type of spring catch means.

The lower sealing piece 9 exhibits a support 21, which carries a continuous swivel-axis 23 by way of a flange 22. This one-piece swivel-axis 23 is grasped by a slotted bearing block 24, which along with the louver 26 forms one piece, since it and the louver were produced as a unit in an extrusion press. Above, the louver 26 rests against a stop 27, which along with the upper sealing piece forms one extrusion-pressed piece. The louver 26 carries holding rails 28 and 29, which serve for the insertion of a plate 30. An elastic connection leads from this plate to the louver actuator or else a return spring 95 is attached to the plate by way of a springy angle piece 31, 32. This sealing piece 9, 10, 26, which usually holds one motor, two blowers and a louver regulating device, has approximately the length of a louver, for example of 50 centimeters.

The lower and upper sealing pieces 9, 10 exhibit flanges 33, 34, which lie in the frontal plane and are suited for covering damaged areas on masonry. They can also serve for the fixing of fastening pieces on the wall, provided that drill holes are present.

The box frame can be closed between two louver regions, which are not immediately adjoining, by sealing pieces 34, 11, 16, 14, 18, 20, 10, 26, 9, 13, 17, 19, 15, 12, and 33, which are uniformly moulded as one piece. Thus, the louver 26 is rigidly connected with 9 and 10.

The floor 4 has impressed, longitudinal notches 35, 36 located near the rear wall 3 for the purpose of making it easier to punch out portions for openings 37. These portions are designed as weakened walls at desired locations and are of expedient form and size for the passage of air.

The floor 4 carries a support 38, on which the switch housing 39 rests. A cable 40, expediently shown as a multistrand cable with plug-and-socket connections 41, 42, is placed within the support.

Each motor-blower unit 45, 50 is enclosed by a housing 57 for guiding air. It opens into a tangential wall 59 in the region of the rear wall 3. This tangential wall is opposite from a reinforced piece 60. This reinforced piece forks and encloses a rib 63 on the floor 4 with its two fork ends 61, 62, which run approximately parallel to the wall 59. This rib 63 is located immediately next to the air intake opening 37. The fork end 61 is rigidly connected with the rib 63 so that the extruded housing 57 for guiding air forms a structural integral unit with the box frame 1, 2, 3, 4 in the region of the motor-blower unit. Two carrying plates 52 with openings 53 for the passage of air are inserted in internal grooves of the housing for guiding air. Expediently, the internal grooves and the carrying plates extend to the opening 37. The carrying plates are held by the mechanical tension of the housing for guiding air, which, if need be, can be drawn together by screws 54 in the region of the walls 59 and 62. The carrying plates 52 carry by way of straps 51 and rings 46 the motor 45 and, with it, the motor shaft 47. Optionally, the motor can also be carried in other ways—for example, by legs. The shaft (as is shown in the right hand side of FIG. 1) carries the blower 50 by way of a tubular shaft 48. This blower consists of two parts and is separated by a double separating wall 49, which carries the blades 50 of the blower.

The housing for guiding air has openings 58 on the side of the louver, for air intake preferably in the region of the motor, so that the air can pass over the motor from 58 towards 53. These openings are made in the form of peripheral slits. For better cooling, the motor can also be built without a cover. At some distance from the rib 63, a second continuous rib 64 is located on the floor 4. Two matching ribs 65 and 66 are situated on the top 1 opposite to the continuous ribs 63 and 64 in such a manner that a filter plate can be installed for catching dust, removing impurities of other types and, if need be, for disinfecting the air. When air is being taken in without the use of a blower and an air guiding housing the room is ventilated only because of a negative pressure in the room.

The air guidance housing is bounded on the free sides by another ring-shaped plate 67, which is likewise inserted in a groove. The reinforced location 60 in the air guidance housing is so placed, that a favorable flow is obtained. For this reason, it stands opposite to the tangential wall 59 with relatively small separation and rises above the lowest point of the air guidance housing.

Figure 2:
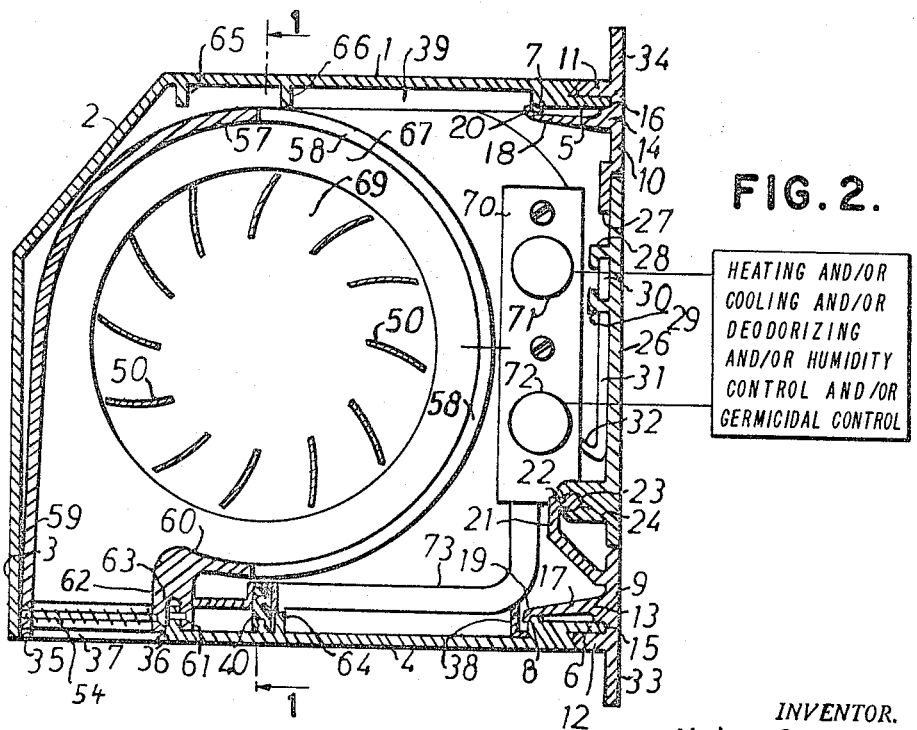
FIG. 2 is taken on the line II—II of FIG. 1.

A plate 70 shown in FIGURE 2 is fixed on the switch housing or on slats 64, 65. This plate carries an air-conditioning and air treating means, which are selected in combinations desired from case to case as the climate and local situation require. These means are: conventional heating means, cooling means, germicidal means, ozonizers, air-oxidizing means, rod-shaped ultraviolet lamps, infrared lamps, disinfectants, perfumizers, filters, etc., generally identified as 71 and 72. This equipment is usually powered by an electric cable 73. These devices are mounted on the air intake side of the assembly when the air conditioning depends on air supply through the radial vanes assembly.

When the air supply is provided by negative pressure in the room by means such as shown in FIG. 11, where the left hand assembly comprises only the automatic vent closure and opening means shown in FIG. 8, the radial pump is absent from that assembly, and its place is utilized by any of the means 71 and 72 instead. In this situation also the filter 43 is placed in the opening 37, as shown in FIG. 2, or may be placed in front of it.

Figure 3:
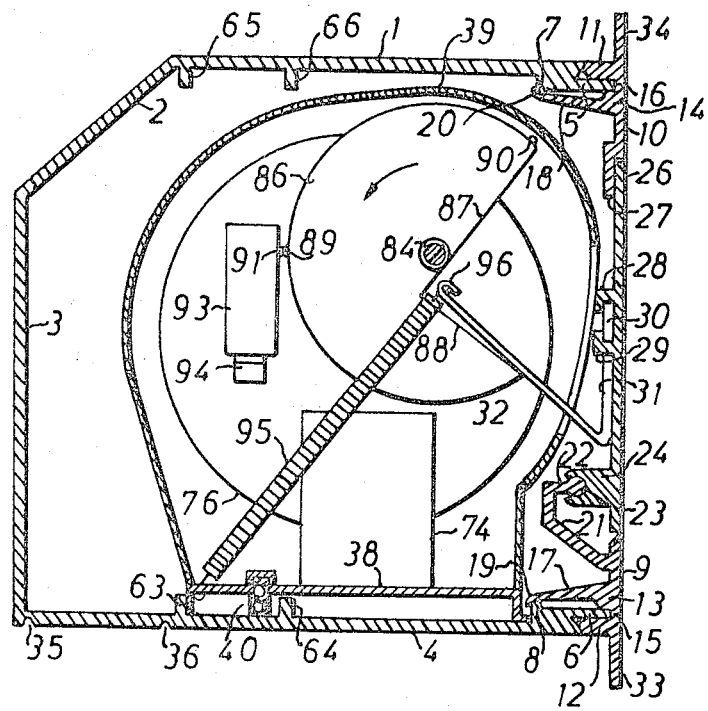
FIG. 3 is taken on the line III—III of FIG. 1.
Figure 5:
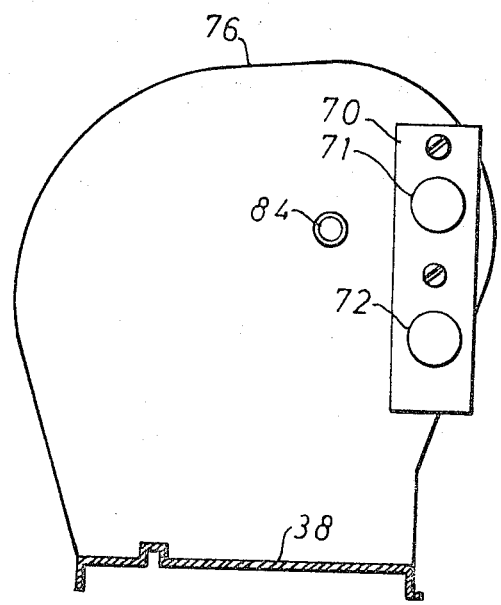
FIG. 5 is a view taken on lines V—V of FIG. 4.
Figure 4:
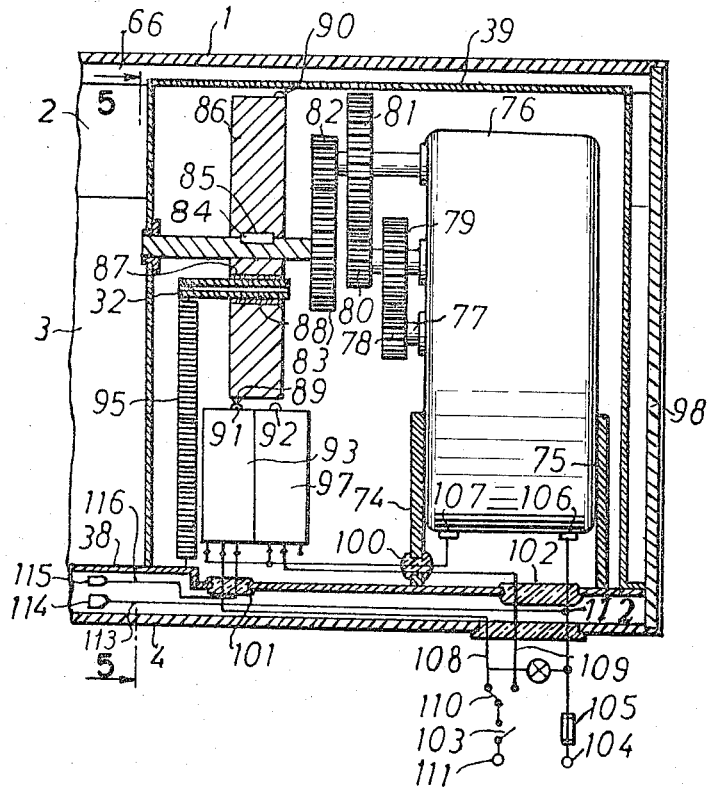
FIG. 4 is a fragmentary front elevational view with parts in section showing the planetary gear arrangement for opening a vent.

FIG. 3 shows in greater detail how the support 38 carries the switch housing 39. The housing can be arranged for a series of motor-blower units in a square frame. The regulating motor 76 is carried within the switch housing by supports 74 and 75. It can be mounted on the rear wall of the housing instead. As shown in FIG. 4, the shaft 77 of the regulating motor drives the shaft 84 by way of a speed-reduction gearing 78 through 83. The shaft is fixedly connected with the switching disc 86 through the use of a key 85. This disc has in the example shown a cutout 44 formed by two approximately perpendicular secants 87 and 88. The switching disc 86 carries two cams 89 and 90, which are slightly differently positioned in FIG. 3 and FIG. 4. These cams work together with the cams 91 and 92 of two microswitches 93 and 97, which are supported on the switch housing 39, for example, by an angle-piece 94.

The support 38 carries a spring 95, whose other end at 96 is attached to the free, springy end of the shank 32, so that the spring, which is in the form of a tension spring, acts over the path 32, 31, 30, 28, and 29 to hold the louver 26 closed. A rotation of the cam disc 86 in the direction of the arrow raises the lever 32 high by the secant 88, thus opening the louver. The shaft 84 lies behind secant 87. The louver remains in the open position until the lever 32 comes onto the secant 87 and slides on this gradually downward in order to assume again the position shown in FIG. 3.

FIG. 8 demonstrates an arrangement alternative to that of FIG. 3. The spring is mounted between the side of the cam disc 86 and the vent or louver 26. Thus during the rotation of the cam disc an opening and closing push-pull are transmitted to the vent.

As can be seen in FIG. 4, two microswitches 93 and 97 are provided. The microswitch 93 has the cam 91 and microswitch 97 bears the cam 92. The cam 91 works together with the rotating cam 89 and the cam 92 together with the rotating cam 90. In the presentation of FIG. 4 the two cams are displaced 180° from one another and the two microswitches are placed downwards for greater reliability in their operation.

FIG. 4 shows moreover the closing of the box frame by a plate 98, whose edge snaps into a slightly inwardly deepening step in the top 1, in the inclined wall 2, in the back wall 3 and in the floor 4.

The lines coming from the microswitches 93 and 97 pass through an insulation 100 in the support 74 as well as through two insulations 101 and 102 in the support 38. If motor 76 is attached directly onto the back wall of the housing the support 74 is unnecessary.

In the situation shown in FIG. 4, the alternating current flows with closed switch 103 from the connection 104 through a fuse 105 to connection 106 on the regulating motor 76. From here, the current goes through the connection 107 to the two microswitches 93 and 97. It therefore immediately flows through one of the lines 108 and 109 and a thermal circuit breaker 110 to the other connection 111. On the other hand, the current can also flow through the branch 112 and through the line 113 to a plug-and-socket connection of the fan motor and from there through the other plug-and-socket connection 115 and the line 116, so that it leads from the microswitch 93 to the line 108 and from there to the connection 111.

Figure 6:
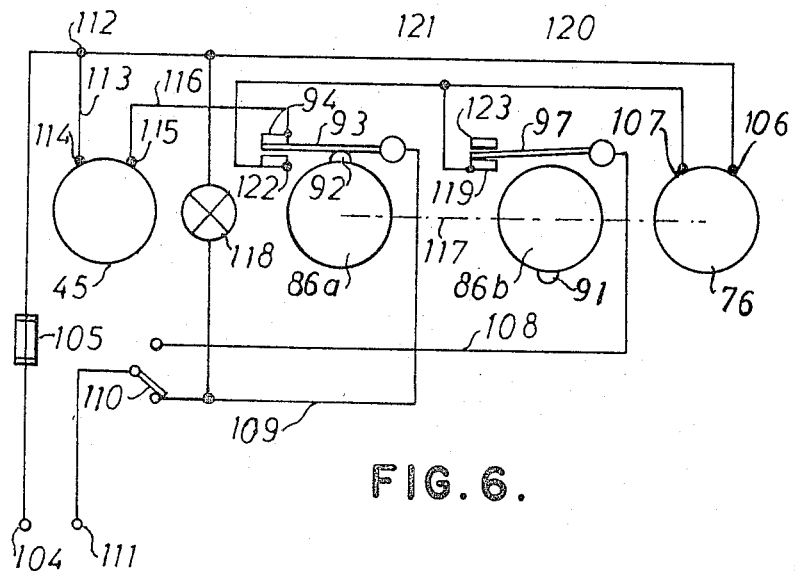
FIG. 6 is a schematic wiring diagram.

In the circuit diagram of FIG. 6, the disc 86 is shown separated, only to simplify the presentation into two disc parts 86a and 86b, to which the cams 92 and 91 are assigned. The speed-reduction gearing is left out and both discs sit with the regulating motor 76 on a common shaft 117. For the position of the switch 110 as shown in the drawing, the current flows from connection 111 on the one hand through a line 109 to the contact lever 93, through the upper stationary contact 94 and the line 116 to the fan motor 52 and finally through 114, 113, 112 and 105 back to 104; on the other hand, a part of the current flows from 109 through the lamp 118, which bridges the motor 45 and indicates operation of the motor. The lamp 118 can also be used as a series resistance for the motor—for example, in the line 113. All other lines are dead.

If the switch 110 is now changed over, in order to end the operation of the fan motor 45 and consequently the ventilation, then the fan motor operating circuit 111, 110, 109, 93, 94, 116, 115, 52, 114, 113, 112, 105 and 104 is broken, while now a regulating motor operating circuit is closed. This regulating motor operating circuit leads through the connection 111, the switch 110, the line 108, the movable contact 97, the lower stationary contact 119 and the line 120 to a connection 107 on the regulating motor 76; from there, the current continues to flow through the connection 106 and the line 121 as well as the fuse 105 back to the connection 104. As a result of this, the regulating motor 76 starts running and turns the disc 86 and thus the two disc parts 86a and 86b. With the beginning of this motion, the movable contact 93 falls down and strikes the lower stationary contact 122 and consequently prepares a second operating circuit for the regulating motor 76. In the instant in which the cam 91 on the disc part 86b reaches its upper position, it lifts the movable contact 97 of the microswitch and places it against the dead contact 123. Now, both lines 108 and 109 are broken respectively at 97 and 110, so that the regulating motor has become currentless.

If it is now desired to again ventilate the room, the switch 110 is again brought into the position shown in FIG. 6. Then, a current flows from 111 through 110, 109, 93, 122, 120 and 107 to the regulating motor 76 and from there through 106, 121, and 105 back to 104. The regulating motor thus begins running and turns the disc 86 and consequently the disc parts 86a and 86b. First of all, the cam 91 allows the movable contact 97 to fall, so that a second line to the regulating motor 76 is prepared. This second line is however in this instant still interrupted by the position of the change-over switch 110. Since, however, now the current line through 111, 110, 109, 93, 122, 120 and 107 is powered, the regulating motor continues to run and opens the louver 26, which is not drawn in this figure. Only when the cam 92 lifts the movable contact 93 is the regulating motor circuit broken and then the regulating motor 76 stops. However, at the same time, the fan motor 45 is supplied on one side through 111, 110, 109, 93, 94, 116 and 115 and on the other side through 114, 113, 112, 105, and 104 and starts running. This means furthermore that the fan motor first starts running, when the louver is open. The louver thus does not need to move against the suction of a negative pressure in the ventilator.

The assembly system demonstrated in FIGS. 11 and 12 and 13 shows the various assembly possibilities of the units and housings. The left hand side units in each of the figures, for instance may be assembled strictly as a plurality of vent opening and closing units shown in FIG. 8 with the empty spaces taken over by air conditioning units 71 and 72 such as described with reference to FIG. 2. The right hand units then are assembled equipped with both the circulating fans and the vent controlling units. In either case each one vent controlling unit may control one vent in front of its own sector 25 or only one elongated vent common to all the assembled sectors may be controlled by a single motor of only one vent control unit. Thus a variety of accuracy of controls may be achieved.

The circuitry may be wired either independently for each unit, or for each assembly of units and or a joint single switch control may be provided to synchronize the operations of the assemblies.

To treat unclean, for example fat-containing or very dusty air, the opening which is closed by the louver 26 can be covered on the inside by an easily cleanable or preferably exchangeable filter, which protects the fan and has an opening for the lever 32.

FIG. 7 shows the upper sealing piece 10 and the lower sealing piece 9 in the region of the louver 26 and a broken-off connecting piece 126, on which a working part can be attached. The regulator housing 39 and a ventilator housing 57 with a motor 45 are indicated with dashed lines.

When the room to be ventilated is under a negative pressure the ventilator serves to take in air, which is then treated for instance, cleaned by a filter, disinfected by ultraviolet radiation, heated, cooled, etc. Generally, at least one motor and at least one blower are placed in the housing. Preferably, the motor has a blower on each side.

In FIG. 1 a dividing wall or plate 52 is shown between the air guiding and the vent control sectors with a circular opening for air suction.

It should be understood of course that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

The invention claimed is:

1. An air exchange system for mounting in a window-, door- or wall-opening comprising at least one assembly of at least one uniformly profiled housing sector of a standardized size, having top, bottom and rear walls, and a front wall assembly; rim profiles, comprising mating tongue and groove means and mating spring catch means elongated in the direction of the line of intersection of said rear wall with said bottom wall, on said housing sector and said front wall assembly for their mating engagement on pressing the rim of the front wall assembly with the rim of said housing into an integral hollow housing unit; an air suction unit, comprising an electrically powered pump motor and at least one radial vane air pump having an axis of rotation parallel to the rear wall of said unit and driven by said pump motor; said front wall assembly comprising an orifice and at least one louver vane means pivotally mounted to open and close said orifice; and circuit means for providing electric connections to said pump motor; said air suction unit, said louver vane means and said circuit means operatively mounted within said housing, whereby control of air circulation is accomplished.

2. An air-exchange system as claimed in claim 1, said housing sector rim profile comprising an edge in each the top and the bottom wall toward the open side, continuous slats, there being one of said slats integrally attached to each of said edges, said slats being offset from said top and bottom walls toward one another and projecting away from said rear wall, and continuous ribs, there being one projecting inwardly from the top wall and one projecting inwardly from the bottom wall, said ribs being spaced from said slats toward said rear wall; said front wall assembly rim profile comprising upper and lower seals each having a continuous groove along its length for the reception of said slats and each a springy flange, which projects toward the said rear wall of the housing and is continuous over its length, inclined surfaces turned away from said top and bottom walls, said flanges gripping behind said inclined surfaces.

3. An air exchange system as claimed in claim 2, the inclined surfaces representing flanks of said ribs.

4. An air exchange system as claimed in claim 3, said louver vane having fastening means continuous over its length and claw-shaped in cross section.

5. An air exchange system as claimed in claim 2, one of said seals having a vent joint being a continuous, inwardly projecting support of claw-shaped cross section with swivel axis 23 attached on its claw edge 22, said louver vane having a continuous, slotted bearing block 24 with a cylindrical channel opening laterally into the slotted portion thereof, said cylindrical channel bearing on said swivel axis.

6. An air exchange system as claimed in claim 2, said louver vane having a bearing block pivoted on one of said seals, the other of said seals having a continuous stop on which said louver vane rests in its orifice-closing position.

7. An air exchange system as claimed in claim 11, said air suction unit having a housing comprising two identical sections, each with axial intake and air guidance openings, said air suction unit having at least one radial vane pump on each side of its motor, each pump being situated in one of said sections, said motor mounted in the adjacent mounting means of said two sections.

8. An air exchange system as claimed in claim 1, further comprising a regulating motor, a cam disc coupled to and driven by said regulating motor, an elastic connection between said louver vane and said cam disc and mounted on the cam disc at a distance from its center to determine the angle of opening of said louver vane, said circuit means including means to control said regulating motor.

9. An air exchange system as claimed in claim 8, further comprising a circular disc driven by said regulating motor and having cams thereon, and at least one microswitch actuated by said cams and operatively connected with said circuit means.

10. An air exchange system as claimed in claim 8, said cam disc having a cut out slot bounded by two approximately perpendicular secants outside of the axis of said disc.

11. An air exchange system as claimed in claim 1, said housing sector having a ventilating opening 37 adjoining said rear wall in said bottom wall, said bottom wall having a floor rib 63 extending parallel to said rear wall, said air suction unit including a suction unit housing comprising a looped sheet section 57 extending from a tangential end 59 to a reinforced, forked end 60, relative deflection of said tangential end and said forked end occurring under spring force arising from said sheet section, said air unit housing mounted in said housing sector at least by said tangential end abutting said rear wall and said forked end straddling said floor rib.

12. An air exchange system as claimed in claim 1, including humidity control means to control the humidity of air passing through the system.

13. An air exchange system as claimed in claim 1, including a mercury discharge lamp means to irradiate air passing through the system.

14. An air exchange system as claimed in claim 1, including infra-red lamp means to irradiate air passing through the system.

15. An air exchange system as claimed in claim 1, including carbon monoxide detector means to detect carbon monoxide in air passing through the system.

16. An air exchange system as claimed in claim 1, including disinfector means to disinfect air passing through the system.

17. An air exchange system as claimed in claim 1, including perfumizer means to perfumize air passing through the system.

18. An air exchange system as claimed in claim 1, including filter means to filter air passing through the system.

19. An air exchange system as claimed in claim 11, said air guidance housing having internal grooves, said system further comprising carrying plates having mounting means for said pump motor and at least one opening for air intake, said carrying plates inserted in said grooves and held therein by the seating of said ends respectively on the rear wall and on the floor rib, said pump motor being mounted in said mounting means.

References Cited
UNITED STATES PATENTS

| | | | |
|---|---|---|---|
| 2,750,868 | 6/1956 | Mieczkowski et al. | |
| 3,139,022 | 6/1964 | Koplar. | |
| 3,253,294 | 5/1966 | Waters | 220—60 |
| 3,260,442 | 7/1966 | Laing | 220—125 |
| 3,267,614 | 8/1966 | Jean-Pierre Cazalis et al. | 220—60 |
| 3,275,224 | 9/1966 | Bush | 230—125 |

ROBERT A. O'LEARY, *Primary Examiner.*

W. E. WAYNER, *Assistant Examiner.*